United States Patent

Saita

[15] 3,689,806
[45] Sept. 5, 1972

[54] TIME HOLDING SWITCH
[72] Inventor: Toshikazu Saita, Himeji, Japan
[73] Assignee: Mitsubishi Denki Kabushiki Kaisha, Chryodaku, Tokyo, Japan
[22] Filed: Aug. 10, 1971
[21] Appl. No.: 170,512

[52] U.S. Cl............317/141 S, 307/10 LS, 307/141, 315/82, 317/148.5 R
[51] Int. Cl. .............................................B60q 1/06
[58] Field of Search........317/141 S, 148 SR; 315/76, 315/77, 82; 307/10 LS, 141, 141.4, 141.8

[56] References Cited

UNITED STATES PATENTS

| | | | |
|---|---|---|---|
| 3,626,239 | 12/1971 | Brock | 315/77 |
| 3,546,527 | 12/1970 | Chunn et al. | 317/141 S |
| 3,376,429 | 4/1968 | Atkins et al. | 307/141 |
| 3,374,394 | 3/1968 | Miller | 315/82 |

*Primary Examiner*—J. D. Miller
*Assistant Examiner*—Harry E. Moose, Jr.
*Attorney*—E. F. Wenderoth et al.

[57] ABSTRACT

The disclosed device comprises serially connected switch, relay and transistor. Upon closing the switch, a dc source renders the transistor conducting to energize the relay connecting the source to a load. Upon opening the switch, a capacitor disposed between it and the relay begins to charge to supply a base current to the transistor to keep the relay energized. At the end of the charging, the transistor becomes nonconducting to deenergize the relay disconnecting the load from the source. Alternately, a capacitor may be connected to the switch to charge during its closure. Upon opening the switch, the capacitor begins to discharge. At the end of this discharging the load is disconnected from the source as in the above case.

3 Claims, 2 Drawing Figures

TOSHIKAZU SAITA,
INVENTOR

ATTORNEYS

TIME HOLDING SWITCH

BACKGROUND OF THE INVENTION

This invention relates to a time holding switch device suitable for use in controlling equipments carried on a motor vehicle.

In motor vehicles, the time holding switch or relay is very serviceable to keep the wiper brushes in operation for a certain interval of time after the front window glass has been spouted with water, to ensure the safety of a person or persons upon getting off the vehicle at night by maintaining the lamp circuit energized after the master key-switch has been open and so on. The conventional type of time holding switches or relays has utilized an electric current discharged from that capacitor connected in parallel to the switch or relay. Alternatively, thermostats have been utilized. In the former case, problem has arisen as to the voltage response of the switch or relay and the operating time has been impossible to be precisely regulated. Also it has been difficult to make the time delay long. With the thermostats utilized, the resulting switches or relays have been disadvantageous in that their useful life is limited, the time delay can not be long, and that they are greatly affected by ambient temperature. Thus there has been provided no device accurate in operation and long in useful life.

SUMMARY OF THE INVENTION

Accordingly it is an object of the invention to provide a new and improved time holding switch device suitable for use with a motor vehicle capable of being controlled in a time delay with which that electric circuit connected thereto is deenergized after the opening of the associated main switch, and long in useful life.

The invention accomplishes this object by the provision of a time holding switch device comprising a source of direct current power, a manually operated, normally open switch, a relay operative when energized operative to supply an electric power from the source to a load circuit with its energized state self-held, and a capacitor, characterized by a transistor responsive to the closure of the manually operated switch to be put in its conducting state by having an electric power supplied thereto from the source through the switch in its closed position, the relay being responsive to the conduction of the transistor to be energized, the capacitor being operatively coupled the transistor to supply, a base current to the transistor to maintain the relay in its energized state for a predetermined interval of time after the opening of the manually operated switch.

The capacitor may be preferably connected to the relay such that for a predetermined interval of time after the opening of the manually operated switch, the capacitor is charged from the source while the charging current is applied to the transistor as the base current.

Alternatively the capacitor may be connected to the manually operated switch such that the capacitor is charged from the source during the closure of the manually operated switch and discharged upon opening the manually operated switch while the discharging current is applied to the transistor as the base current.

BRIEF DESCRIPTION OF THE DRAWING

The invention will become more readily apparent from the following detailed description taken in conjunction with the accompanying drawing in which.

DESCRIPTION OF THE PREFERRED EMBODIMENTS

Figure 1:
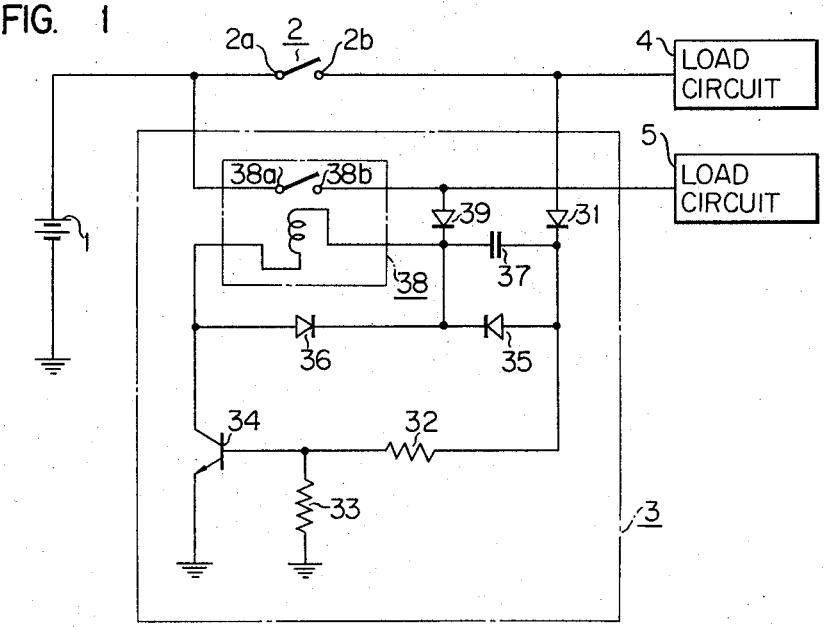
FIG. 1 is a schematic circuit diagram of an embodiment according to the time holding switch device of the invention wherein a charging current for a capacitor involved is utilized.

Referring now to FIG. 1 of the drawing, it is seen that an arrangement disclosed herein comprises a source of direct current power 1 such as a battery equipped on a motor vehicle (not shown), and a manually operated, normally open switch 2 including a movable contact 2a connected to one terminal in this case a positive terminal of the source 1 and a stationary contact 2b connected to a load circuit 4 adapted to be controlled by the switch 2. The source 1 includes the other or negative terminal connected to ground. The source 1 is also connected at the one or positive terminal to a time holding switch generally designated by the reference numeral 3 which is, in turn, connected to another load circuit 5 for the purpose of controlling that load circuit.

The manually operated switch 2 may be, for example, a master key-switch provided on the vehicle. The load circuit 4 includes electric circuits operatively coupled to the associated internal combustion engine (not shown) and the load circuit 5 may include, for example, a lamp circuit and others.

The time holding switch 3 includes a semiconductor diode 31 having an anode electrode connected to the stationary contact 2b of the manually operated switch 2 and a cathode electrode connected to ground through a series combination of resistor 32 and base resistor 33. The junction of the resistors 32 and 33 is connected to a base electrode of a common emitter transistor 34. The cathode electrode of the diode 31 is also connected to the collector electrode of the transistor 34 through a pair of semiconductor diodes 35 and 36 interconnected in series opposition relationship. In this case, both the diodes 35 and 36 have their cathode electrodes connected to each other.

Further the cathode electrode of the diode 31 is connected through a capacitor 37 to an operating winding of a relay generally designated by the reference numeral 38. The relay 38 includes a movable contact 38a connected to a lead connecting the source 1 to the switch 2 and a stationary contact 38b connected to the load circuit 5. The stationary contact 38b is also connected to an anode electrode of a semiconductor diode 39 including a cathode electrode connected to the junction of the capacitor 37 and the relay 38 winding and then to the junction of the two diodes 35 and 36.

The arrangement illustrated is operated as follows: The switch 2 is manually operated to engage the movable contact 2a with the stationary contact 2b. This causes the source 1 to supply an electric power to the load circuit 4 through the now closed switch 2. Simultaneously the source 1 supplies an electric power to the time holding switch 3 through the closed switch 2. A current passed through the diode 31 is applied by the resistor 32 to the base electrode of the transistor 34 to render the transistor 34 conducting to permit the relay winding to be energized by the source 1 through the now closed switch 2, the diode 31, the diode 35 and the now conducting transistor 34.

In that event, all the current flowing through the relay winding is caused to flow through the collector-to-emitter circuit of the transistor 34 because the diode 36 is connected to the collector electrode of the transistor with the polarity reverse with respect to this current. When energized, the relay 38 closes the contacts 38a and 38b. The closure of those contacts causes the source 1 to supply an electric power to the load circuit 5 and also to the relay 38 winding through its closed contacts 38a–38b and the diode 39 to self-hold it in its energized state. That is, the diode 39 forms a circuit for self-holding the relay 38 along with the contacts 38a–38b and the transistor 34.

Under these circumstances, when the manually operated switch is opened, the power supply to the load circuit 4 is interrupted while at the same time, the base current from the source 1 terminates to be applied to the base electrode of the transistor 34 through the diode 31 and the resistor 32. At that time, however, the capacitor 37 is initiated to charge with a current flowing through a time constant circuit including the relay contacts 38a–38b, the diode 39, the capacitor 37 and the resistors 32 and 33. The time constant circuit has a time constant mainly determined by the magnitudes of the capacitor 37, the resistor 32 and the resistor 33 connected across the base-to-emitter circuit of the transistor 34. This charging current is also supplied, as a base current, to the base electrode of the transistor 34 whereby the transistor is still maintained in its conducting state to keep the relay 38 energized. Therefore the relay contacts 38a–38b is in their closed position to cause the source 1 to continue to supply the electric power to the load circuit 5 through the closed contacts. Since the capacitor 37 supplies the base current to the transistor, the same can be considered to be included in the base circuit of the transistor 34.

However, the charging current starting with the opening of the switch 2 gradually decays as the capacitor 3 is charged. Eventually the magnitude of the charging current is not sufficient to maintain the transistor 34 in its conducting state. At that time, the transistor 34 becomes nonconducting resulting in the deenergization of the relay 38. When deenergized, the relay 38 opens its contacts 38a–38b to interrupt the power supply to the load circuit 5 while inhibiting the source 1 from supplying the electric power to the time holding switch 3.

An interval of time between the opening of the manually operated switch 2 and the interruption of the power supply to the load circuit 5 is dependent upon the time constant of the time constant circuit as above described, in this case, the charging circuit for the capacitor 37. That is that interval of time can readily change by controlling the magnitude of at least one of the capacitor 37 and the resistors 32 and 33. For example, if the resistor 32 increases in magnitude of resistance to decrease the charging current applied, as the base current, to the transistor then the interval of time as above described correspondingly increases and therefore the load circuit 5 is deenergized with a longer time delay after opening of the manually operated switch 2.

It will readily be understood that, upon succeedingly closing the manually operated switch 2, the transistor 34 is again conducting to permit the charge accumulated on the capacitor 37 to discharge through the relay 38 winding and the now conducting transistor 34.

Figure 2:
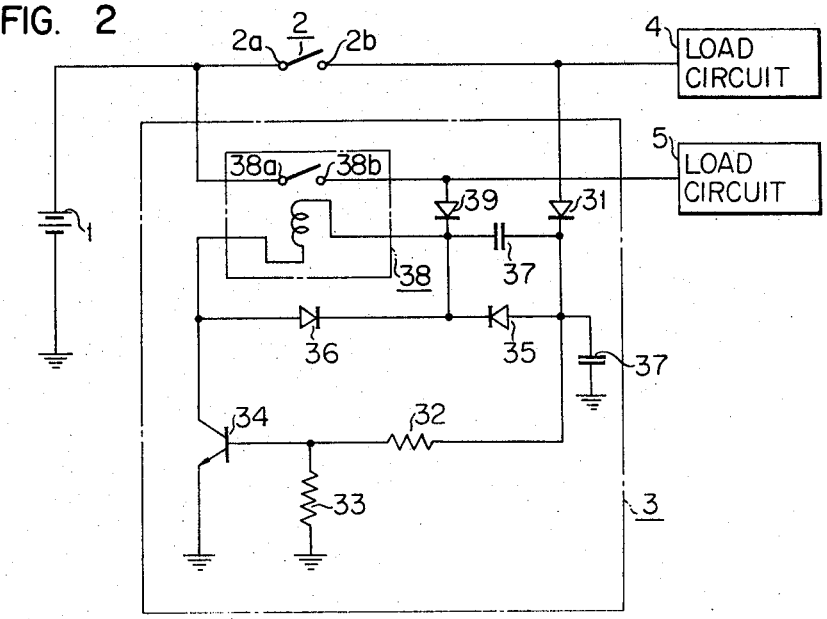
FIG. 2 is a view similar to FIG. 1 but illustrating a modification of the invention wherein a discharging current from the capacitor is utilized.

While the invention has been described in terms of the charging of the capacitor 37, it is to be understood that the same is equally applicable to the discharging of a capacitor as shown in FIG. 2.

In FIG. 2 wherein like reference numerals designate the components identical or corresponding to those shown in FIG. 1, the capacitor 37 is shown as being connected between the junction of the diodes 31 and 35 and ground rather than between the diodes 31 and 39 at their cathode electrodes. That is, the capacitor 37 is connected to the manually operated switch 2 on the load side through the diode 31. In other respects, the arrangement is identical to that illustrated in FIG. 1.

In the arrangement of FIG. 2, the capacitor 37 is adapted to charge from the source 1 during the closure of the manually operated switch 2 and to discharge through a time constant circuit including the capacitor 37, the resistor 32 and the resistor 33, after the switch 2 has been operated.

From the foregoing description made in conjunction with FIG. 1 it will be apparent that the arrangement of FIG. 2 is substantially identically in operation to that shown in FIG. 1 excepting that the discharging current from the capacitor 37 is effective for still maintaining the transistor 34 in its conducting state as in the arrangement of FIG. 1.

From the foregoing it will be appreciated that the manually operated switch is closed to supply individual electric powers from the source to the two load circuits and that the interruption of the power supply to one of the load circuits is accomplished simultaneously with the opening of the manually operated switch while the power supply to the other load circuit can be caused to cease after the manually operated switch has been opened and at the end of a predetermined interval of time dependent upon the time constant of the charging or discharging circuit for the capacitor as the case may be whereupon the power supply to the time holding switch is also interrupted.

The invention has several advantages. For example, the charging or discharging current for the capacitor is required only to be very low as compared with the prior art type devices because the holding time or time delay provided by the time holding switch is dependent upon the charging or discharging current for the capacitor also supplied, as the base current, to the transistor. Then the charging or discharging time for the capacitor can very readily adjusted at will by simply controlling the magnitude of at least one of the capacitor and the associated resistors. Further the control of the other load circuit is accomplished by putting the transistor in its conducting or nonconducting state without the necessity of utilizing any mechanical part such as a thermostat previously used. Thus there is no failure due to a wear of such a mechanical part resulting in long life devices.

What is claimed is:

1. A time holding switch device comprising, in combination, a source of electric power, a manually operated switch, a transistor responsive to the closure of said manually operated switch to be put in its conducting state by having an electric power supplied thereto from said source through said switch in its closed position, a relay responsive to the conduction of said transistor to be energized thereby to supply an electric power from said source to a load circuit while the same is self-held in its energized state, and a capacitor operatively coupled to said transistor to supply a base current to the latter to maintain the transistor in its energized state for a predetermined interval of time after the opening of the manually operated switch.

2. A time holding switch device as claimed in claim 1, wherein said capacitor is connected to said relay to charge from said source for the predetermined interval of time after the opening of the manually operated switch with the charging current for the capacitor supplied, as the base current, to said transistor.

3. A time holding switch device as claimed in claim 1, wherein said capacitor is connected to said manually operated switch to charge from said source during the closure of the switch and to discharge upon opening the switch with the discharging current from the capacitor supplied, as the base current, to said transistor.

* * * * *